United States Patent
Hou et al.

(10) Patent No.: US 11,966,153 B2
(45) Date of Patent: Apr. 23, 2024

(54) WAVELENGTH CONVERSION MODULE AND PROJECTION APPARATUS

(71) Applicant: Coretronic Corporation, Hsin-Chu (TW)

(72) Inventors: Ming-Feng Hou, Hsin-Chu (TW); Shi-Wen Lin, Hsin-Chu (TW); Shih-Hang Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/720,319

(22) Filed: Apr. 14, 2022

(65) Prior Publication Data
US 2022/0342290 A1 Oct. 27, 2022

(30) Foreign Application Priority Data
Apr. 25, 2021 (CN) .......................... 202120854392.3

(51) Int. Cl.
G03B 21/20 (2006.01)
G02B 26/00 (2006.01)
G03B 21/16 (2006.01)

(52) U.S. Cl.
CPC ......... *G03B 21/204* (2013.01); *G02B 26/008* (2013.01); *G03B 21/16* (2013.01)

(58) Field of Classification Search
None
See application file for complete search history.

(56) References Cited

U.S. PATENT DOCUMENTS

2022/0260241 A1* 8/2022 Iizawa ................. F21V 29/502

FOREIGN PATENT DOCUMENTS

| CN | 204534444 | 8/2015 |
|---|---|---|
| TW | I651580 | 2/2019 |

* cited by examiner

*Primary Examiner* — Bao-Luan Q Le
*Assistant Examiner* — Danell L Owens
(74) *Attorney, Agent, or Firm* — JCIPRNET (57) ABSTRACT

A wavelength conversion module includes a driving element, a wavelength conversion wheel, and at least one flow guide. The wavelength conversion wheel includes a rotary disc and at least one wavelength conversion layer. The driving element is connected to the rotary disc to drive the wavelength conversion wheel to rotate along an axis of the driving element as a central axis. The flow guide is disposed beside the wavelength conversion wheel at intervals along the axis, and at least one airflow channel is formed between the flow guide and the wavelength conversion wheel. The flow guide and the driving element are disposed at intervals, and the flow guide does not contact the rotary disc and the driving element. An orthographic projection of the flow guide on the rotary disc overlaps the wavelength conversion layer. When the wavelength conversion wheel rotates, the wavelength conversion wheel and the flow guide move relatively.

20 Claims, 7 Drawing Sheets

WAVELENGTH CONVERSION MODULE AND PROJECTION APPARATUS

CROSS-REFERENCE TO RELATED APPLICATION

This application claims the priority benefit of China application serial no. 202120854392.3, filed on Apr. 25, 2021. The entirety of the above-mentioned patent application is hereby incorporated by reference herein and made a part of this specification.

BACKGROUND

Technical Field

The invention relates to an optical module and a projection apparatus, particularly to a wavelength conversion module and a projection apparatus including the wavelength conversion module.

Description of Related Art

In an apparatus of the solid-state laser (SSI laser) projector, the phosphor wheel is located on the transmission path of the blue excitation beam provided by the light source module, and the light conversion area of the phosphor wheel is equipped with a phosphor layer that can be excited to emit yellow light, and the light-transmitting area of the phosphor wheel allows the blue excitation beam to pass through, where the blue excitation beam is incident in the light conversion area of the phosphor wheel and is converted into a yellow beam, the blue excitation beam enters the transmission area of the phosphor wheel and directly passes it through, so that the blue excitation beam and the yellow beam sequentially output by the phosphor wheel and combined to produce white light. However, when the phosphor is irradiated by the blue excitation beam, a high temperature is generated and it significantly attenuates the conversion efficiency of the phosphor.

At present, most of the heat dissipation design of the phosphor wheel is to provide a concave-convex structure or fins on the rotary disc of the phosphor wheel to enhance the disturbance of the surrounding flow field, thereby dissipating the heat on the rotary disc. However, this method not only has limited heat dissipation effect, but also has a large wind resistance on the structure, which is prone to making noise, and therefore it is not the best solution.

The dual-disc technology also emerged subsequently, which adds a cover on the periphery of the rotary disc and the cover is fixed on the phosphor wheel, and an airflow channel is disposed between the rotary disc and the cover to force the airflow into the channel when the rotary disc rotates. However, since the rotary disc and the cover need to be driven at the same time, the demand of the motor power is higher, and the space demand is also larger. Also, due to the configuration of the cover, the overall weight also increases greatly.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides a wavelength conversion module capable of increasing the air flow velocity on the surface of the rotary disc when rotating, thereby increasing the heat transfer efficiency of a wavelength conversion layer.

The present invention also provides a projection apparatus, including the above-mentioned wavelength conversion module which has better projection quality and product competitiveness.

The other objectives and advantages of the present invention may be further understood from the technical features disclosed in the present invention.

To achieve one or part or all of the above-mentioned purposes or other purposes, an embodiment of the present invention provides a wavelength conversion module configured on a transmission path of an excitation beam. The wavelength conversion module includes a driving element, a wavelength conversion wheel, and at least one flow guide. The wavelength conversion wheel includes a rotary disc and at least one wavelength conversion layer disposed on the rotary disc. The driving element is connected to the rotary disc of the wavelength conversion wheel, and the wavelength conversion wheel is driven to rotate along an axis of the driving element as the central axis. The flow guide is disposed beside the wavelength conversion wheel at intervals along the axis, and at least one airflow channel is formed between the flow guide and the wavelength conversion wheel. The flow guide and the driving element are disposed at intervals, and the flow guide is not in contact with the rotary disc and the driving element. The orthographic projection of the flow guide on the rotary disc overlaps the wavelength conversion layer. When the wavelength conversion wheel rotates, a relative movement between the wavelength conversion wheel and the flow guide occurs.

In order to achieve one, part, or all of the above objectives or other objectives, an embodiment of the present invention further provides a projection apparatus including: an illumination module, a light valve, and a projection lens. The illumination module is adapted to provide an illumination beam, and the illumination module includes a light source device and a wavelength conversion module. The light source device is adapted to provide an excitation beam. The wavelength conversion module is configured on a transmission path of the excitation beam. The wavelength conversion module includes a driving element, a wavelength conversion wheel, and at least one flow guide. The wavelength conversion wheel includes a rotary disc and at least one wavelength conversion layer disposed on the rotary disc. The wavelength conversion layer is adapted to convert the excitation beam into a conversion beam. The illumination beam includes an excitation beam and a conversion beam. The driving element is connected to the rotary disc of the wavelength conversion wheel, and the wavelength conversion wheel is driven to rotate along the axis of the driving element as the central axis. The flow guide is disposed beside the wavelength conversion wheel at intervals along the axis, and at least one airflow channel is formed between the flow guide and the wavelength conversion wheel. The flow guide and the driving element are disposed at intervals, and the flow guide is not in contact with the rotary disc and the driving element. The orthographic projection of the flow guide on the rotary disc overlaps the wavelength conversion layer. When the wavelength conversion wheel rotates, a relative movement between the wavelength conversion wheel and the flow guide occurs. The light valve is disposed on a transmission path of the illumination beam to convert the illumination beam into an image beam. The projection lens is disposed on a transmission path of the image beam to project the image beam from the projection apparatus.

Based on the above, the embodiments of the present invention have at least one of the following advantages or effects. In the wavelength conversion module of the present invention, an airflow channel is formed between the flow guide and the wavelength conversion wheel, and the flow guide is not in contact with the rotary disc and the driving element. When the wavelength conversion wheel rotates, a relative movement between the wavelength conversion wheel and the flow guide occurs. With the configuration of the flow guide, airflow is generated when the wavelength conversion wheel and the flow guide move relative to each other. In addition, during the guiding process, the airflow passing through the wavelength conversion wheel takes away the heat, and the airflow becomes more concentrated with faster air flow velocity, thereby increasing the heat dissipation efficiency of the wavelength conversion module. In addition, the projection apparatus adopting the wavelength conversion module of the present invention has better projection quality, thereby enhancing product competitiveness.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
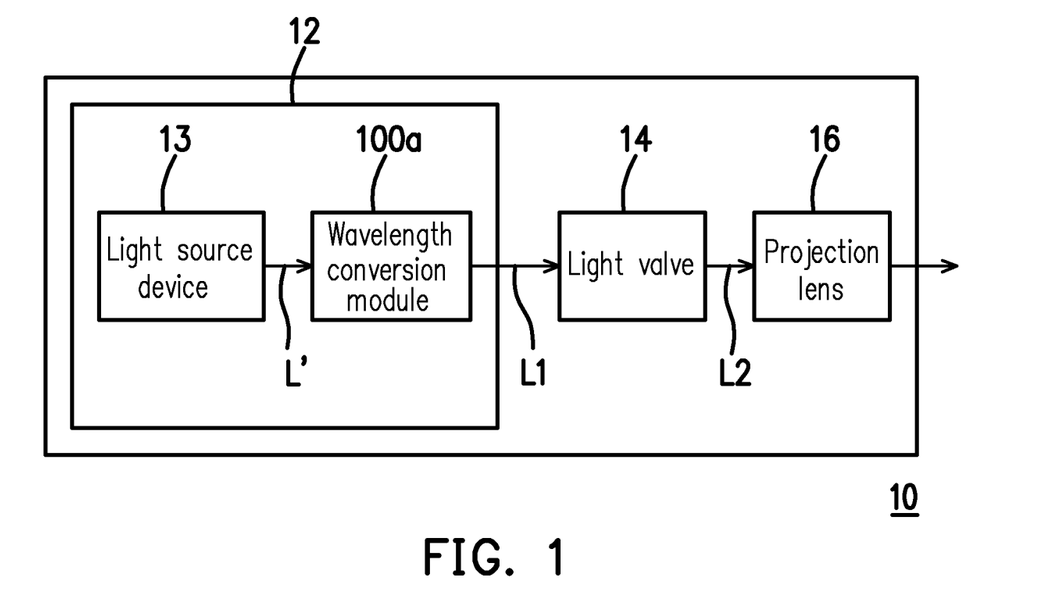
FIG. 1 is a schematic view of a projection apparatus according to an embodiment of the invention.

FIG. 1 is a schematic view of a projection apparatus according to an embodiment of the invention. In FIG. 1, a projection apparatus 10 of this embodiment includes an illumination module 12, a light valve 14, and a projection lens 16. The illumination module 12 is adapted to provide an illumination beam L1, and the illumination module 12 includes a light source device 13 and a wavelength conversion module 100a. The light source device 13 is adapted to provide an excitation beam L'. The wavelength conversion module 100a is, for example, a phosphor wheel for receiving the excitation beam L' from the light source device 13. The wavelength conversion module 100a is configured on a transmission path of the excitation beam L' and is adapted to convert the excitation beam L' into a conversion beam with different wavelength. Herein, the illumination beam L1 includes the excitation beam L' and the conversion beam. The light valve 14 is disposed on a transmission path of the illumination beam L1 to convert the illumination beam L1 into an image beam L2. The projection lens 16 is disposed on a transmission path of the image beam L2 to project the image beam L2 from the projection apparatus 10.

Furthermore, the light source device 13 used in this embodiment is, for example, a laser diode (LD), such as a single laser diode or a laser diode bank. Specifically, any light source that meets the volume requirement in actual design may be implemented, and the present invention is not limited to this. The light valve 14 is, for example, a reflective light modulator such as a liquid crystal on silicon panel (LCoS panel) and a digital micro-mirror device (DMD). In one embodiment, the light valve 14 is, for example, a transparent liquid crystal panel, an electro-optical modulator, a magneto-optic modulator, an acousto-optic modulator (AOM), or other transmissive optical modulators, but the form and type of the light valve 14 are not limited in this embodiment. General knowledge in the technical field may provide sufficient teaching, suggestion, and implementation instructions for the detailed steps and implementation methods of modulating the illumination beam L1 (the excitation beam L' and the conversion beam) by the light valve 14 into the image beam L2, and thus they are not repeated herein. In addition, the projection lens 16 includes, for example, a combination of one or more optical lenses having diopter, such as various combinations of non-planar lenses such as biconcave lenses, biconvex lenses, meniscus lenses, convex-concave lenses, plano-convex lenses, and plano-concave lenses. In an embodiment, the projection lens 16 also include a flat optical lens to convert the image beam from the light valve 14 into a projection beam and project it from the projection apparatus 10 by reflection or transmission. Herein, the embodiment does not limit the form and type of the projection lens 16.

Figure 2A:
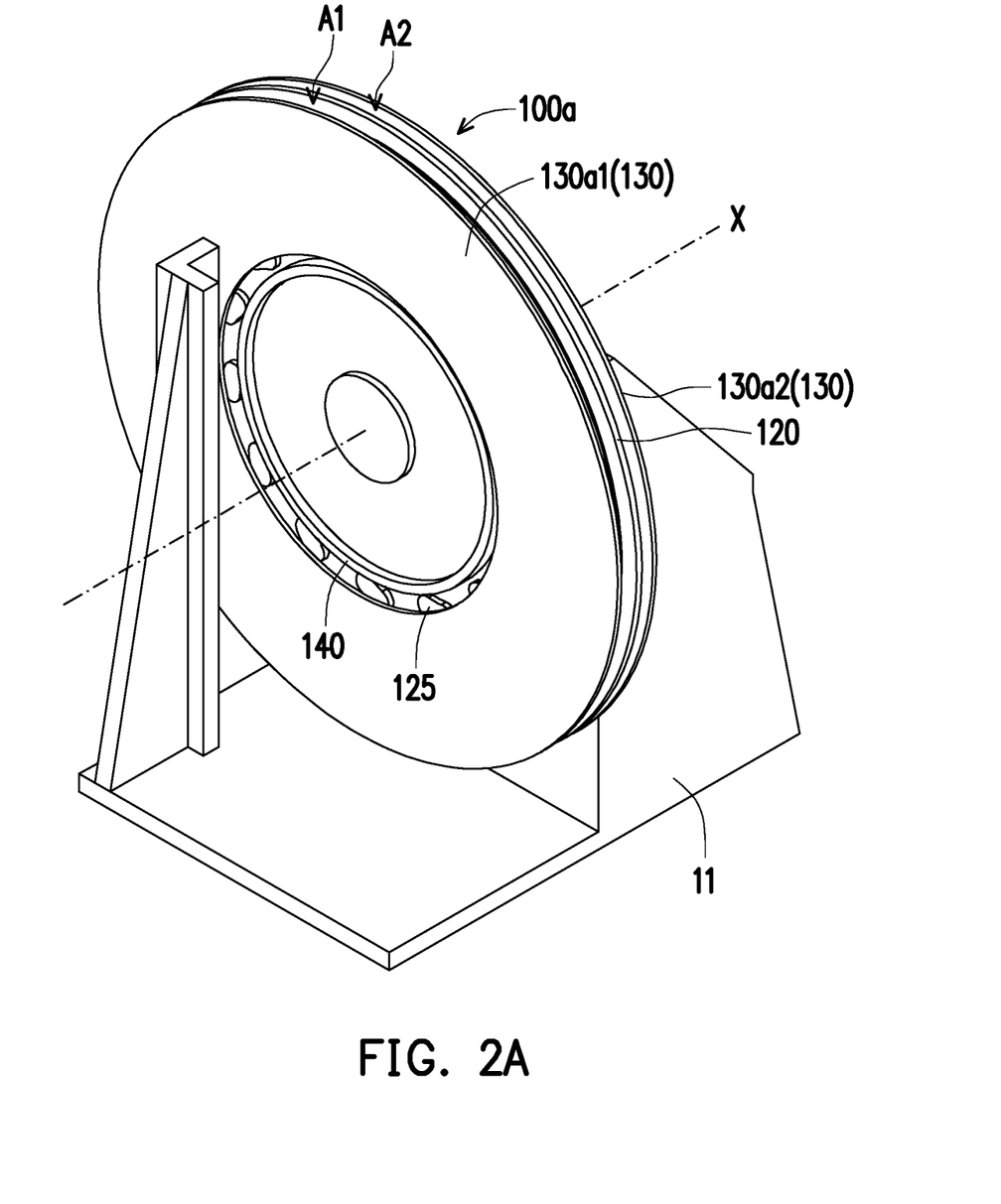
FIG. 2A is a three-dimensional schematic view of the relative positions of the wavelength conversion module of the projection apparatus and the fixing member of the illumination module in FIG. 1.
Figure 2B:
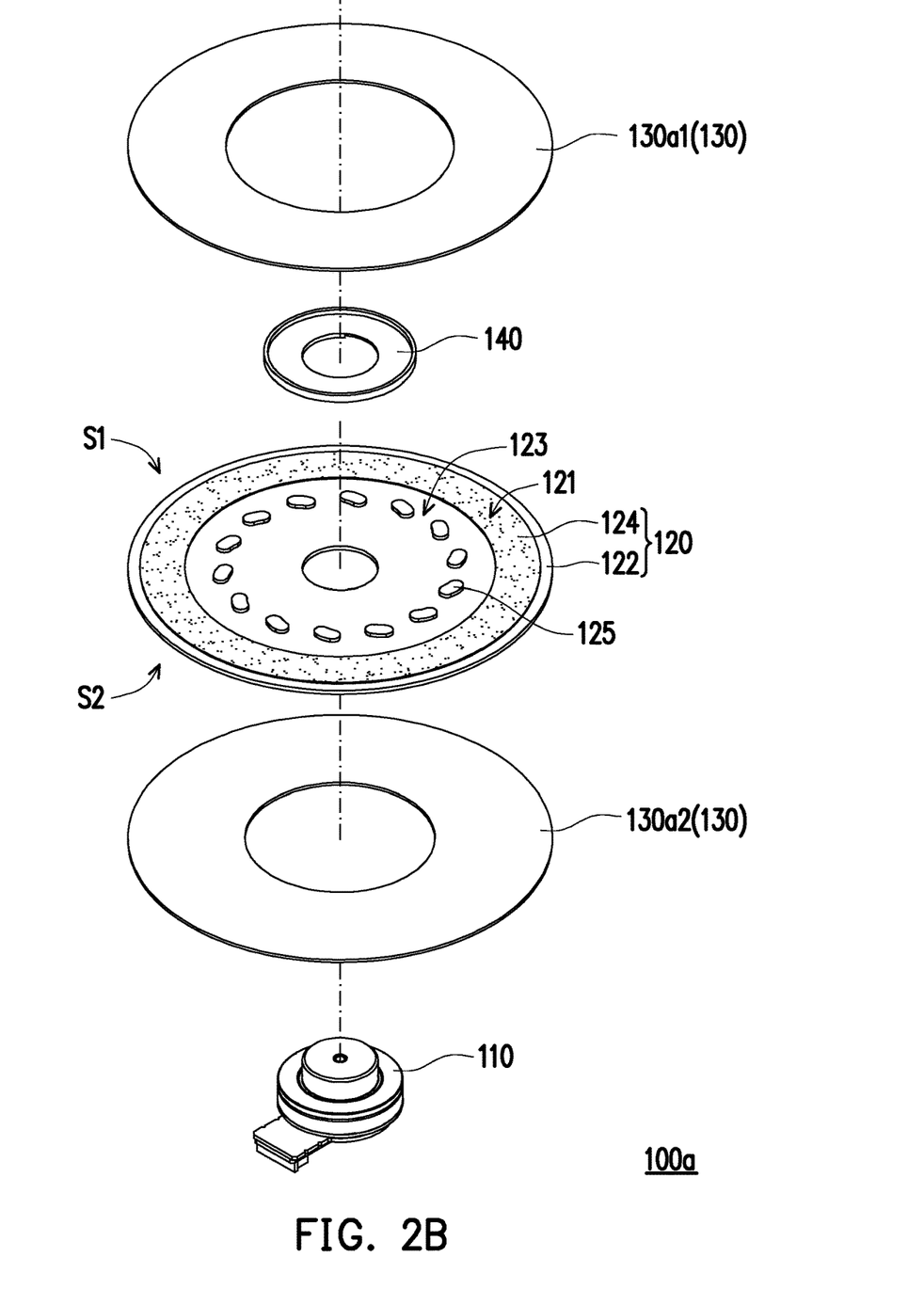
FIG. 2B is a three-dimensional exploded schematic view of the wavelength conversion module of FIG. 2A.
Figure 2C:
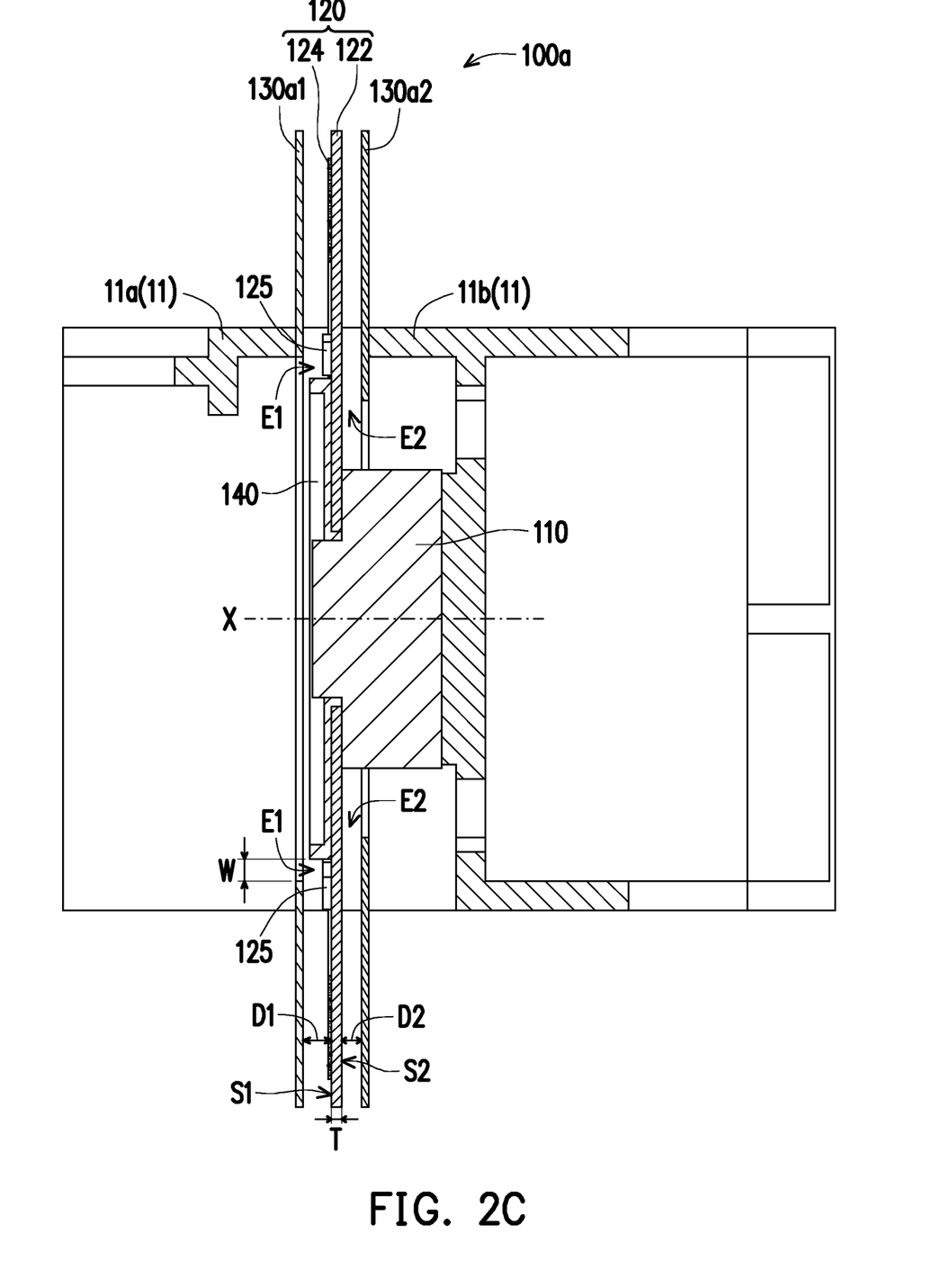
FIG. 2C is a schematic cross-sectional view taken along the line I-I of FIG. 2A.

FIG. 2A is a three-dimensional schematic view of the relative positions of the wavelength conversion module of the projection apparatus and the fixing member of the illumination module in FIG. 1. FIG. 2B is a three-dimensional exploded schematic view of the wavelength conversion module of FIG. 2A. FIG. 2C is a schematic cross-sectional view taken along the line I-I of FIG. 2A. Please refer to FIG. 2A and FIG. 2B at the same time. In this embodiment, the wavelength conversion module 100a includes a driving element 110, a wavelength conversion wheel 120, and at least one flow guide 130. The wavelength conversion wheel 120 includes a rotary disc 122 and at least one wavelength conversion layer (schematically shown as a wavelength conversion layer 124) disposed on the rotary disc 122. The driving element 110 is connected to the rotary disc 122 of the wavelength conversion wheel 120 to drive the wavelength conversion wheel 120 to rotate along an axis X of the driving element 110 as the central axis.

Furthermore, the wavelength conversion wheel 120 of this embodiment has a light conversion area 121 and a non-light conversion area 123. The rotary disc 122 has a light-facing side S1 and a backlight side S2 that are opposite to each other, wherein the light-facing side S1 is the side facing the light source device 13. The wavelength conversion layer 124 is located on the light-facing side S1 of the rotary disc 122 and is disposed in the light conversion area 121. In addition, in order to have a better heat dissipation effect, the wavelength conversion wheel 120 of this embodiment may also include a plurality of heat dissipation structures 125 separated from each other, wherein the heat dissipation structures 125 are located on the rotary disc 122 and are disposed in the non-light conversion area 123. As shown in FIG. 2A and FIG. 2B, the heat dissipation structure 125 may be located on the surface of the light-facing side S1 of the rotary disc 122, and the heat dissipation structures 125 are embodied as structures protruding from the rotary disc 122. In an embodiment not shown, the heat dissipation structure 125 may also be located on the surface of the backlight side S2, or the heat dissipation structure 125 may also be located on the surfaces of the light-facing side S1 and the backlight side S2, or the heat dissipation structures 125 may be embodied as structures recessed into the rotary disc 122. In other words, the heat dissipation structures 125 may be located on the surface of at least one of the light-facing side S1 and the backlight side S2, and the heat dissipation structures 125 may be structures protruding from the rotary disc 122 or structures recessed into the rotary disc 122. In addition, for balance correction, the wavelength conversion module 100a of this embodiment may also include a counterweight ring 140, which is fixed on the light-facing side S1 of the rotary disc 122 along the axis X.

Furthermore, please refer to FIG. 2A and FIG. 2B at the same time. The flow guide 130 of this embodiment is disposed beside the wavelength conversion wheel 120 at intervals along the axis X, and it includes a first flow guide 130a1 and a second flow guide 130a2. The first flow guide 130a1 is located on the light-facing side S1 of the rotary disc 122, and the second flow guide 130a2 is located on the backlight side S2 of the rotary disc 122. That is to say, the wavelength conversion wheel 120 is located between the first flow guide 130a1 and the second flow guide 130a2. The first flow guide 130a1 and the second flow guide 130a2 are respectively disposed coaxially to the driving element 110 at intervals. Specifically, the first flow guide 130a1 and the second flow guide 130a2 are, for example, hollow-ring-shaped (or O-shaped) discs, and the shape of the rotary disc 122 is a hollow ring shape. And the rotary disc 122, the first flow guide 130a1, and the second flow guide 130a2 are respectively disposed coaxially to the driving element 110. Herein, the material of the first flow guide 130a1 and the second flow guide 130a2 is, for example, a light-transmitting material, but it is not limited thereto.

In particular, in this embodiment, the first flow guide 130a1 and the second flow guide 130a2 are not in contact with the rotary disc 122 and the driving element 110. Herein, as shown in FIG. 2C, the first flow guide 130a1 and the second flow guide 130a2 are disposed on a fixing member 11 of the lighting module 12. The fixing member 11 includes, for example, a first fixing member 11a and a second fixing member 11b located on opposite sides of the wavelength conversion wheel 120, wherein the first flow guide 130a1 is connected to the first fixing member 11a, so that the first flow guide 130a1 is disposed beside the wavelength conversion wheel 120 at intervals; and the second flow guide 130a2 is connected to the second fixing member 11b, so that the second flow guide 130a2 is disposed beside the wavelength conversion wheel 120 at intervals. In other embodiments, the flow guide 130 may also be disposed at places such as a non-rotating part of the wavelength conversion module 100a, or the optical machine housing which the wavelength conversion module 120 is fixed, the base of the projection apparatus 10, so it does not rotate at the same speed and the same direction as the rotary disc 122, so as to achieve the diversion effect. Among this configuration, when the first flow guide 130a1 is fixed to the first fixing member 11a and the second flow guide 130a2 is fixed to the second fixing member 11b, the first flow guide 130a1 and the second flow guide 130a2 are non-moving elements, wherein the flow guide is be fixed to the fixing member by means of screws or adhesive, etc., which is not limited by the present invention; when the first flow guide 130a1 is rotatably connected to the first fixing member 11a and the second flow guide 130a2 is rotatably connected to the second fixing member 11b, the first flow guide 130a1 and the second flow guide 130a2 are able to rotate at a constant speed and in different directions or in the same direction with the rotary disc 122 at different speeds. In addition, an airflow channel A1 is formed between the first flow guide 130a1 and the wavelength conversion wheel 120, and an airflow channel A2 is formed between the second flow guide 130a2 and the wavelength conversion wheel 120.

Furthermore, again in FIG. 2C, along the axis X, a first distance D1 exists between the first flow guide 130a1 and the light-facing side S1 of the rotary disc 122, a second distance D2 exists between the second flow guide 130a2 and the backlight side S2 of the rotary disc 122, and the first distance D1 and the second distance D2 are, for example, respectively greater than or equal to a thickness T of the rotary disc 122. Preferably, the first distance D1 and the second distance D2 are respectively greater than or equal to the thickness T of the rotary disc 122 while less than 10 times the thickness T of the rotary disc 122. That is, along the axis X, the distance between the first flow guide 130a1 and the rotary disc 122 and the distance between the second flow guide 130a2 and the rotary disc 122 are greater than or equal to the thickness T of the rotary disc 122 and less than 10 times the thickness T of the rotary disc 122. Herein, the first distance D1 is different from the second distance D2, and the first distance D1 is greater than the second distance D2. In one embodiment, if the first distance D1 and the second distance D2 are the same, the first distance D1 and the second distance D2 may be 2 mm, respectively. In another embodiment, the first distance D1 is different from the second distance D2, wherein the first distance D1 is smaller than the second distance D2, and the first distance D1 is, for example, 2 mm, and the second distance D2 is, for example, 6 mm.

Please refer to FIG. 2B and FIG. 2C again. In this embodiment, along the axis X, the orthographic projections of the first flow guide 130a1 and the second flow guide 130a2 on the rotary disc 122 overlap the wavelength conversion layer 124. Furthermore, the orthographic projections of the first flow guide 130a1 and the second flow guide 130a2 on the rotary disc 122 of this embodiment at least partially overlap the heat dissipation structure 125. Also, the wavelength conversion module 100a of this embodiment further includes an air inlet E1 and an air inlet E2, and the air inlets E1 and E2 are respectively formed on the first flow guide 130a1 and the second flow guide 130a2 are adjacent to the axis X. In addition, the air inlet E1 exposes part of the heat dissipation structure 125, and the air inlet E1 also exposes part of the rotary disc 122. Preferably, a width W of the air inlet E1 in the radial direction is 5 mm.

When the wavelength conversion wheel 120 rotates, a relative movement between the wavelength conversion wheel 120 and the first flow guide 130a1 or the second flow guide 130a2 occurs. Herein, the relative movement between the wavelength conversion wheel 120 and the first flow guide 130a1 or the second flow guide 130a2 includes, for example, the wavelength conversion wheel 120 rotates but the first flow guide 130a1 and the second flow guide 130a2 do not rotate, the rotation direction of the wavelength conversion wheel 120 is opposite to the rotation direction of the first flow guide 130a1 and the rotation direction of the second flow guide 130a2, or, the rotation direction of the wavelength conversion wheel 120 is the same as the rotation direction of the first flow guide 130a1 and the second flow guide 130a2 but the speed is different. When the airflow enters the airflow channels A1 and A2 from the air inlets E1 and E2 and guided by the first flow guide 130a1, the second flow guide 130a2, and the rotary disc 122, the airflow passing through the wavelength conversion wheel 120 becomes more concentrated with faster flow rate; in addition, when the airflow enters the airflow channels A1 and A2 from the air inlets E1 and E2, the airflow is transmitted to the periphery of the wavelength conversion wheel 120 through the airflow channels A1 and A2, thereby increasing the heat dissipation efficiency of the wavelength conversion module 100a.

In addition, since the orthographic projections of the first flow guide 130a1 and the second flow guide 130a2 on the rotary disc 122 along the direction of the rotation axis X at least partially overlap the heat dissipation structure 125, on the airflow guiding paths of the first flow guide 130a1 and the second flow guide 130a2, the heat energy is dissipated due to the large surface area of the heat dissipation structure 125, and the heat dissipation structure 125 also makes the airflow disturbance on the airflow guiding paths more turbulent, which improves the heat dissipation effect. In addition, a heat dissipation structure 125 may be configured in the area where the air inlet E1 is projected onto the rotary disc 122 along the direction of the rotation axis X, so that the airflow is introduced from the air inlet E1 more easily, increasing the air flow velocity, so that the heat dissipation effect is improved.

Note here that the following embodiments adopt the element numbers and part of the content of the foregoing embodiments, wherein the same numbers represent the same or similar elements, and the description of the same technical content is omitted. For the description of the omitted elements, reference may be made to the foregoing embodiments, and the following embodiments do not repeated the same discussion.

Figure 3:
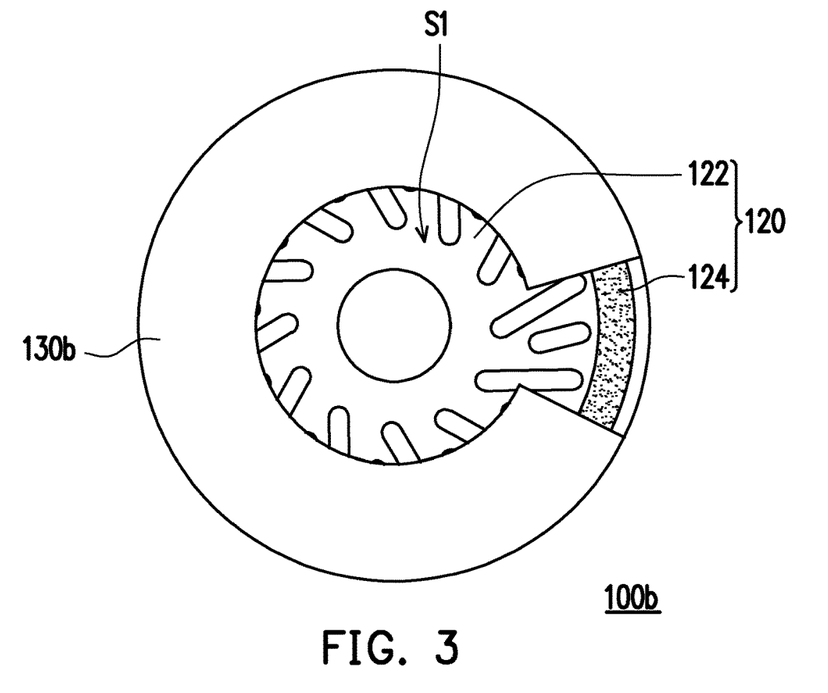
FIG. 3 is a schematic top view of a wavelength conversion module according to an embodiment of the invention.

FIG. 3 is a schematic top view of a wavelength conversion module according to an embodiment of the invention. Please refer to FIG. 2A and FIG. 3 at the same time. A wavelength conversion module 100b of this embodiment is similar to the wavelength conversion module 100a of FIG. 2A. The difference between the two is: in this embodiment, the number of a flow guide 130b is one and it is located on a light-facing side S1 of a rotary disc 122, the shape of the flow guide 130b is embodied as a C-shape. In another embodiment not shown, the flow guide 130b may also be located on a backlight side S2 of the rotary disc 122 (please refer to FIG. 2C). As long as the flow guide 130b is not in contact with the rotary disc 122 and the driving element 110 (please refer to FIG. 2C), and the orthographic projection of the flow guide 130b on the rotary disc 122 along the direction of a rotation axis X overlaps a wavelength conversion layer 124, it is within the protection range of the present invention. In addition, the relative movement between the wavelength conversion wheel 120 and the flow guide 130b of this embodiment is embodied as the following situation: the flow guide 130b is stationary (as a non-moving part), and the wavelength conversion wheel 120 rotates relative to the flow guide 130b. Since the flow guide 130b is disposed correspondingly to the light conversion area 121, its material or shape must not block the incidence of the excitation beam, so that it does not affect the wavelength conversion. Preferably, the material of the flow guide 130b is, for example, a partially transparent material or an opaque material. Herein, if the shape of the flow guide 130b is C-shaped, the gap of the shape C may correspond to the transmission path of the excitation beam.

Figure 4:
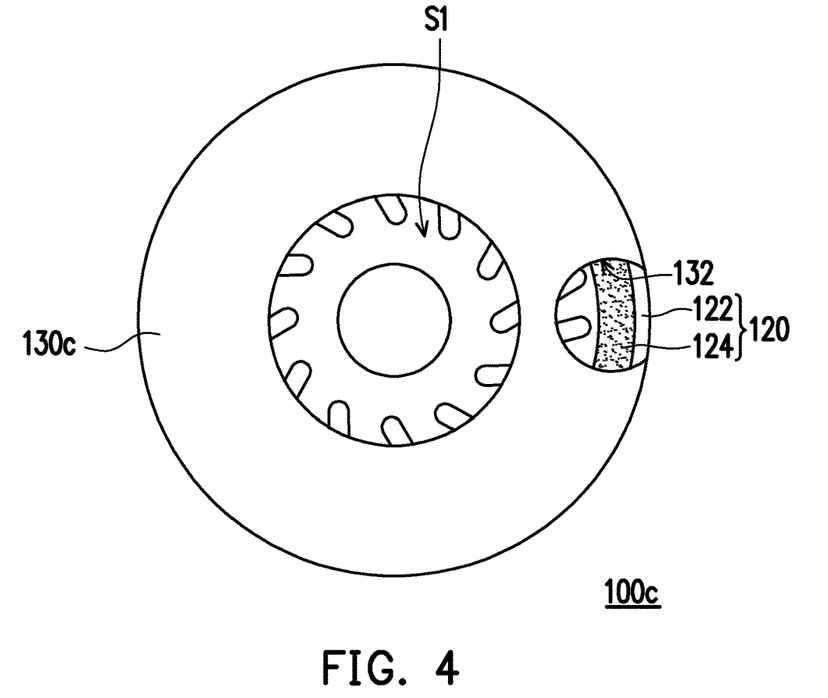
FIG. 4 is a schematic top view of a wavelength conversion module according to another embodiment of the invention.

FIG. 4 is a schematic top view of a wavelength conversion module according to another embodiment of the invention. Please refer to FIG. 3 and FIG. 4 at the same time. A wavelength conversion module 100c of this embodiment is similar to the wavelength conversion module 100b of FIG. 3. The difference between the two is: in this embodiment, the shape of a flow guide 130c is embodied as a ring shape, a flow guide 130c has an opening 132 corresponding to the transmission path of the excitation beam, and the opening 132 exposes part of a wavelength conversion layer 124. That is to say, the opening 132 of the flow guide 130c serves as the incident location of the excitation beam.

Figure 5A:
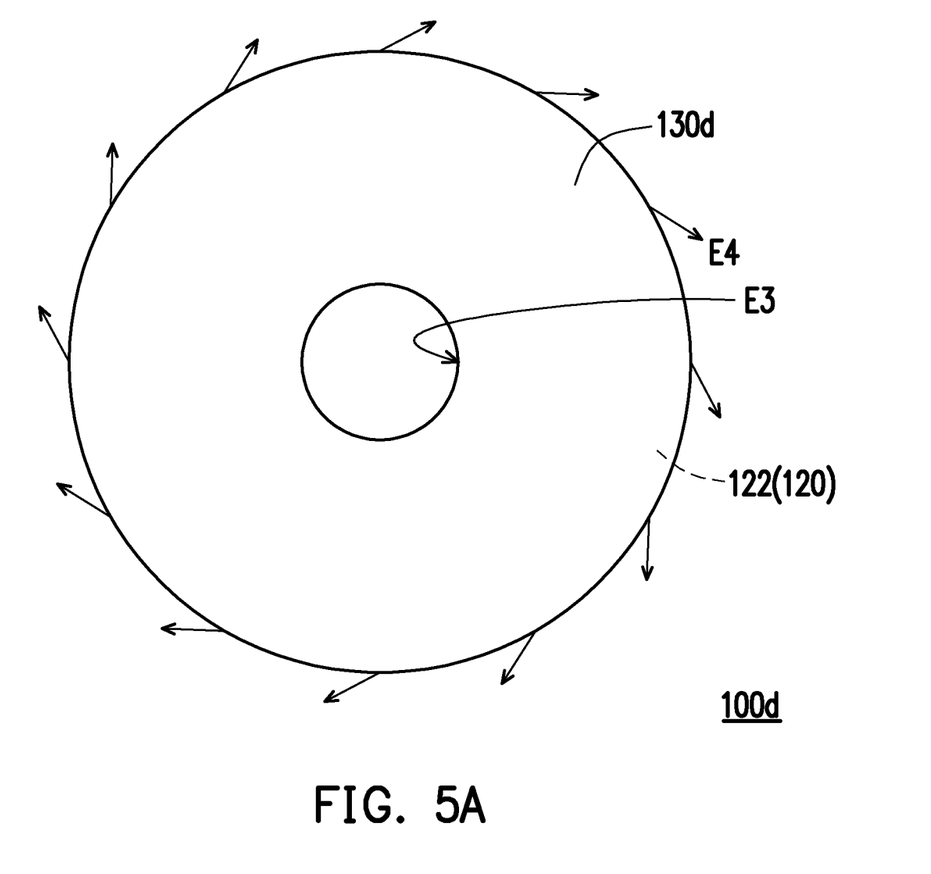
FIG. 5A is a schematic top view of a wavelength conversion module according to another embodiment of the invention.
Figure 5B:
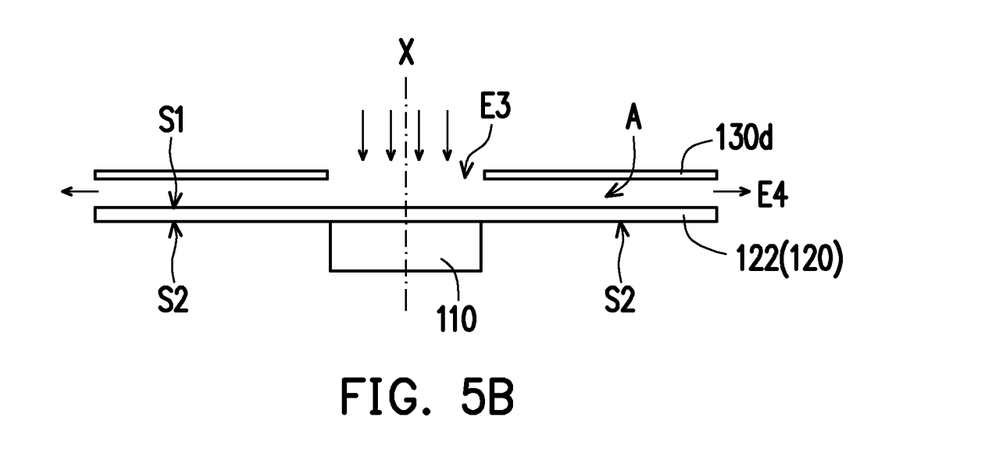
FIG. 5B is a schematic side view of the wavelength conversion module of FIG. 5A.

FIG. 5A is a schematic top view of a wavelength conversion module according to another embodiment of the invention. FIG. 5B is a schematic side view of the wavelength conversion module of FIG. 5A. Please refer to FIG. 2A, FIG. 5A, and FIG. 5B at the same time. A wavelength conversion module 100d of this embodiment is similar to the wavelength conversion module 100a of FIG. 2A. The difference between the two is: in this embodiment, the wavelength conversion module 100d includes a hollow ring-shaped flow guide 130b, and the flow guide 130b is located on a light-facing side S1 of a rotary disc 122, the wavelength conversion module 100d is not provided with a counterweight ring, and an airflow channel A is formed between a wavelength conversion wheel 120 and the flow guide 130d, and the wavelength conversion module 100d includes an air inlet E3 and an annular air outlet E4. The air inlet E3 is the hollow in the center of the flow guide 130d and is correspondingly formed where the flow guide 130d is adjacent to an axis X. The annular air outlet E4 is formed between the flow guide 130d and the periphery of the rotary disc 122 of the wavelength conversion wheel 120. In order to meet the flow conservation, the area of the air inlet E3 must be larger than the area of the annular air outlet E4. When the wavelength conversion wheel 120 rotates, the relative movement between the wavelength conversion wheel 120 and the flow guide 130d generates an airflow, wherein the airflow enters the airflow channel A from the air inlet E3 and is discharged from the annular air outlet E4. That is, when the wavelength conversion wheel 120 rotates, the relative movement between the wavelength conversion wheel 120 and the flow guide 130d generates an airflow, which sucks the cooling air into the air inlet E3 to be guided to the outer periphery of the guide rotary disc 122 and discharged from the annular air outlet E4. During the guiding process, the airflow flows through the rotary disc 122, which takes away the heat and the flow guide 130d concentrates the airflow, such that the air flow velocity is faster, and the heat dissipation efficiency is increased.

Figure 6A:
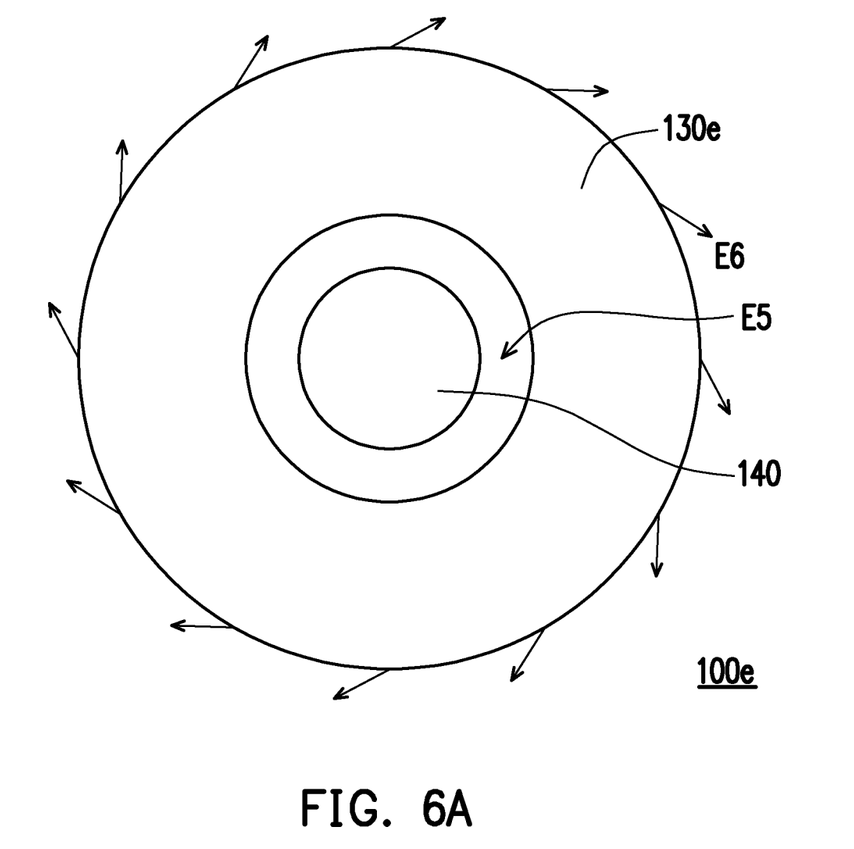
FIG. 6A is a schematic top view of a wavelength conversion module according to another embodiment of the invention.
Figure 6B:
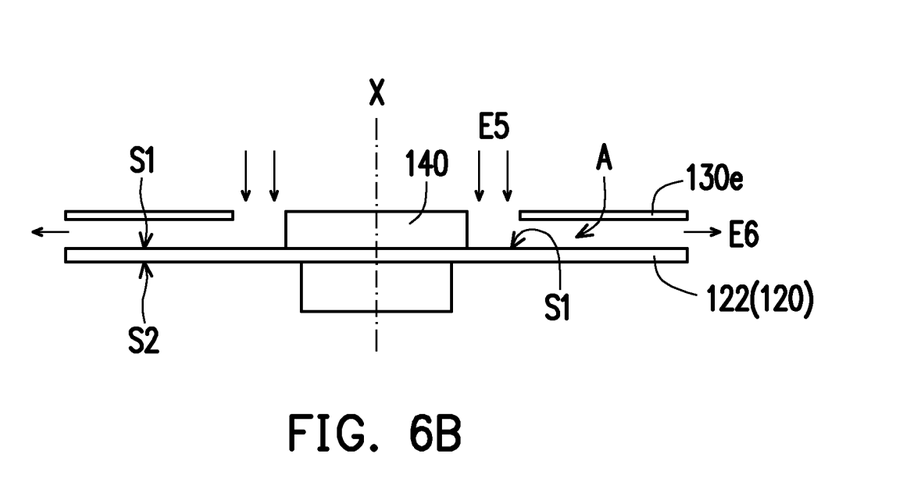
FIG. 6B is a schematic side view of the wavelength conversion module of FIG. 6A.

FIG. 6A is a schematic top view of a wavelength conversion module according to another embodiment of the invention. FIG. 6B is a schematic side view of the wavelength conversion module of FIG. 6A. Please refer to FIG. 5A, FIG. 5B, FIG. 6A, and FIG. 6B at the same time. A wavelength conversion module 100e of this embodiment is similar to the wavelength conversion module 100d of FIG. 5A. The difference between the two is that: FIG. 5A and FIG. 5B are not provided with a counterweight ring, and a counterweight ring 140 of the wavelength conversion module 100e of this embodiment is located on a light-facing side S1 of the rotary disc 122. The wavelength conversion module 100e includes an air inlet E5 and an annular air outlet E6. The air inlet E5 is formed in the annular area between a flow guide 130e and a counterweight ring 140. The annular air outlet E6 is formed between the flow guide 130e and the periphery of the rotary disc 122 of the wavelength conversion wheel 120. When the wavelength conversion wheel 120 rotates, the relative movement between the wavelength conversion wheel 120 and the flow guide 130e generates airflow, and the airflow enters the airflow channel A from the air inlet E5 and is discharged from the annular air outlet E6.

In summary, the embodiments of the present invention have at least one of the following advantages or effects. In the wavelength conversion module of the present invention, an airflow channel is formed between the flow guide and the wavelength conversion wheel, and the flow guide is not in contact with the rotary disc and the driving element. When the wavelength conversion wheel rotates, the wavelength conversion wheel and the flow guide move relatively. With the configuration of the flow guide, airflow is generated when the wavelength conversion wheel and the flow guide move relatively to each other, and during the guiding process, the airflow passing through the wavelength conversion wheel takes away the heat, and the airflow is more concentrated with faster air flow velocity, thereby increasing the heat dissipation efficiency of the wavelength conversion module. In addition, the projection apparatus adopting the wavelength conversion module of the present invention has better projection quality, thereby enhancing product competitiveness.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A wavelength conversion module disposed on a transmission path of an excitation beam, the wavelength conversion module comprising a driving element, a wavelength conversion wheel, and at least one flow guide, wherein:

the wavelength conversion wheel comprises a rotary disc and at least one wavelength conversion layer disposed on the rotary disc;

the driving element is connected to the rotary disc of the wavelength conversion wheel to drive the wavelength conversion wheel to rotate along an axis of the driving element as a central axis; and the at least one flow guide is disposed beside the wavelength conversion wheel at intervals along the axis and at least one airflow channel is formed between the at least one flow guide and the wavelength conversion wheel, wherein the at least one flow guide and the driving element are disposed at intervals, the at least one flow guide is not in contact with the rotary disc and the driving element, an orthographic projection of the at least one flow guide on the rotary disc overlaps at least part of the at least one wavelength conversion layer, and when the wavelength conversion wheel rotates, a relative velocity between the wavelength conversion wheel and the at least one flow guide occurs.

2. The wavelength conversion module according to claim 1, wherein the wavelength conversion wheel has a light conversion area and a non-light conversion area, and the rotary disc has a light-facing side and a backlight side opposite to each other, the at least one wavelength conversion layer is located on the light-facing side of the rotary disc and is disposed in the light conversion area.

3. The wavelength conversion module according to claim 2, wherein the at least one flow guide is located on the light-facing side or the backlight side of the rotary disc.

4. The wavelength conversion module according to claim 3, wherein the number of the at least one flow guide is one, and the flow guide is located on the light-facing side of the rotary disc, and the relative velocity between the wavelength conversion wheel and the flow guide comprises the flow guide remaining stationary and the wavelength conversion wheel rotating relatively to the flow guide.

5. The wavelength conversion module according to claim 4, wherein a material of the flow guide comprises a partially light-transmitting material or a non-light-transmitting material, the flow guide has an opening corresponding to the transmission path of the excitation beam, and the opening exposes part of the at least one wavelength conversion layer.

6. The wavelength conversion module according to claim 2, wherein the at least one flow guide comprises a first flow guide and a second flow guide, the first flow guide is located on the light-facing side of the rotary disc, and the second flow guide is located on the backlight side of the rotary disc.

7. The wavelength conversion module according to claim 6, wherein along the axis, a first distance exists between the first flow guide and the light-facing side of the rotary disc, and a second distance exists between the second flow guide and the backlight side of the rotary disc, and the first distance and the second distance are respectively greater than or equal to a thickness of the rotary disc.

8. The wavelength conversion module according to claim 7, wherein the first distance and the second distance are the same or different.

9. The wavelength conversion module according to claim 2, wherein the wavelength conversion wheel further comprises a plurality of heat dissipation structures separated from each other, the heat dissipation structures are disposed on the rotary disc and located in the non-light conversion area, the orthographic projection of the at least one flow guide on the rotary disc at least partially overlaps the heat dissipation structures.

10. The wavelength conversion module according to claim 9, wherein the heat dissipation structures are located on at least one of the light-facing side and the backlight side of the rotary disc.

11. The wavelength conversion module according to claim 9, further comprising at least one air inlet, the at least one air inlet is formed on the at least one flow guide is adjacent to the axis, and the at least one air inlet exposes part of the heat dissipation structures.

12. The wavelength conversion module according to claim 1, wherein a shape of the at least one flow guide comprises a C-shape or a ring shape, and the rotary disc and the at least one flow guide are respectively disposed coaxially with the driving element.

13. The wavelength conversion module according to claim 1, wherein along the axis, a distance between the at least one flow guide and the rotary disc is greater than or equal to a thickness of the rotary disc and is less than 10 times the thickness of the rotary disc.

14. The wavelength conversion module according to claim 1, further comprising at least one air inlet and at least one annular air outlet, wherein the at least one air inlet is formed where the at least one flow guide is adjacent to the axis, the at least one annular air outlet is formed between the at least one flow guide and a periphery of the rotary disc of the wavelength conversion wheel, and an area of the at least one air inlet is larger than an area of the at least one annular air outlet.

15. The wavelength conversion module according to claim 14, wherein when the wavelength conversion wheel rotates, the relative velocity between the wavelength conversion wheel and the at least one flow guide generates airflow, and the airflow enters the at least one airflow channel from the at least one air inlet and is discharged from the at least one annular air outlet.

16. The wavelength conversion module according to claim 1, wherein the relative velocity between the wavelength conversion wheel and the at least one flow guide comprises a rotation direction of the wavelength conversion wheel being opposite to a rotation direction of the at least one flow guide, or a rotation direction of the wavelength conversion wheel being the same as a rotation direction of the at least one flow guide with a different speed.

17. A projection apparatus, comprising an illumination module, a light valve, and a projection lens, wherein:

the illumination module is adapted to provide an illumination beam, and the illumination module comprises a light source device and a wavelength conversion module, wherein:

the light source device is adapted to provide an excitation beam; and the wavelength conversion module is configured on a transmission path of the excitation beam, and the wavelength conversion module comprises a driving element, a wavelength conversion wheel, and at least one flow guide, wherein:

the wavelength conversion wheel comprises a rotary disc and at least one wavelength conversion layer disposed on the rotary disc, the at least one wavelength conversion layer is adapted to convert the excitation beam into a conversion beam, and the illumination beam comprises the excitation beam and the conversion beam;

the driving element is connected to the rotary disc of the wavelength conversion wheel to drive the wavelength conversion wheel to rotate along an axis of the driving element as a central axis; and the at least one flow guide is disposed beside the wavelength conversion wheel at intervals along the axis, and at least one airflow channel is formed between the at least one flow guide and the wavelength conversion wheel, wherein the at least one flow guide and the driving element are disposed at intervals, the at least one flow guide is not in contact with the rotary disc and the driving element, an orthographic projection of the at least one flow guide on the rotary disc overlaps at least part of the at least one wavelength conversion layer, and when the wavelength conversion wheel rotates, a relative velocity between the wavelength conversion wheel and the at least one flow guide occurs;

the light valve is disposed on a transmission path of the illumination beam to convert the illumination beam into an image beam; and the projection lens is disposed on a transmission path of the image beam to project the image beam from the projection apparatus.

18. The projection apparatus according to claim 17, further comprising a fixing member, wherein the at least one flow guide is disposed on the fixing member.

19. The projection apparatus according to claim 18, wherein the at least one flow guide comprises a first flow guide and a second flow guide, and the wavelength conversion wheel is located between the first flow guide and the second flow guide.

20. The projection apparatus according to claim 19, wherein the fixing member comprises a first fixing member and a second fixing member located on opposite sides of the wavelength conversion wheel, the first flow guide is connected to the first fixing member, so that the first flow guide is disposed beside the wavelength conversion wheel at intervals, the second flow guide is connected to the second fixing member, so that the second flow guide is disposed beside the wavelength conversion wheel at intervals.

* * * * *